US012000260B2

(12) United States Patent
Yepez

(10) Patent No.: US 12,000,260 B2
(45) Date of Patent: Jun. 4, 2024

(54) MONITORING AND DIAGNOSIS OF EQUIPMENT HEALTH

(71) Applicant: Schlumberger Technology Corporation, Sugar Land, TX (US)

(72) Inventor: Juan-Carlos Yepez, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 37 days.

(21) Appl. No.: 16/940,036

(22) Filed: Jul. 27, 2020

(65) Prior Publication Data
US 2022/0027862 A1    Jan. 27, 2022

(51) Int. Cl.
*G06Q 10/06* (2023.01)
*E21B 44/00* (2006.01)
(Continued)

(52) U.S. Cl.
CPC ............ *E21B 44/00* (2013.01); *G05B 19/048* (2013.01); *G06Q 10/06316* (2013.01);
(Continued)

(58) Field of Classification Search
None
See application file for complete search history.

(56) References Cited

U.S. PATENT DOCUMENTS 4,922,514 A * 5/1990 Bergeron ............. H04M 11/045
379/49
5,745,049 A    4/1998 Akiyama et al.
(Continued)

FOREIGN PATENT DOCUMENTS

WO    2016010779 A1    1/2016
WO    2016026680 A1    2/2016
(Continued)

OTHER PUBLICATIONS

Baokui et al. (Baokui Gao, Xuanzhuo Han, Hongqiang Zhang, Study on H2S Monitoring Technique for High Risk Wellsite, Procedia Engineering, vol. 45, 2012, pp. 898-903, ISSN 1877-7058, https://doi.org/10.1016/j.proeng.2012.08.256).*

*Primary Examiner* — Matthew D Henry
(74) *Attorney, Agent, or Firm* — Cameron R. Sneddon

(57) ABSTRACT

Systems and methods for monitoring and diagnosis of equipment health. An example method may include commencing operation of a monitoring system of a well construction system to cause the monitoring system to receive sensor data facilitated by sensors disposed in association with a corresponding piece of equipment, detect an abnormal condition associated with a piece of equipment based on the sensor data, and output abnormal condition information indicative of the abnormal condition to a first communication device. The method may further include displaying on the first communication device to technical support personnel the abnormal condition information, receiving by the first communication device from the technical support personnel mitigation information indicative of mitigating action to be performed to mitigate the abnormal condition, and transmitting the mitigation information from the first communication device to a second communication device to be viewed by maintenance personnel who are to perform the mitigating action.

20 Claims, 4 Drawing Sheets

(51) Int. Cl.
  *G05B 19/048* (2006.01)
  *G06Q 10/0631* (2023.01)
  *G06Q 50/02* (2012.01)
  *G07C 3/00* (2006.01)

(52) U.S. Cl.
  CPC .............. *G06Q 50/02* (2013.01); *G07C 3/00* (2013.01); *G05B 2219/24015* (2013.01)

(56) References Cited

U.S. PATENT DOCUMENTS

| | | | |
|---|---|---|---|
| 6,898,968 | B2 | 5/2005 | Biester et al. |
| 6,941,244 | B1 | 9/2005 | Saito et al. |
| 7,062,960 | B2 | 6/2006 | Couren et al. |
| 7,099,649 | B2 | 8/2006 | Patterson et al. |
| 7,143,007 | B2 | 11/2006 | Long et al. |
| 7,274,989 | B2 | 9/2007 | Hopper |
| 7,302,842 | B2 | 12/2007 | Biester et al. |
| 7,880,634 | B2 | 2/2011 | Fuller et al. |
| 7,925,472 | B2 | 4/2011 | Nasr et al. |
| 8,112,521 | B2 | 2/2012 | Barnett et al. |
| 8,134,474 | B2 | 3/2012 | Fuller et al. |
| 8,204,697 | B2 | 6/2012 | Garvey et al. |
| 8,216,517 | B2 | 7/2012 | Prasad et al. |
| 8,347,957 | B2 | 1/2013 | Stephenson et al. |
| 8,423,397 | B2 | 4/2013 | Sitton |
| 8,490,705 | B2 | 7/2013 | Curtiss, III |
| 8,503,190 | B2 | 8/2013 | Tart et al. |
| 8,554,717 | B2 | 10/2013 | Reckmann et al. |
| 8,560,096 | B1 | 10/2013 | Chapman et al. |
| 8,560,097 | B1 | 10/2013 | Chapman et al. |
| 8,560,098 | B1 | 10/2013 | Chapman et al. |
| 8,583,597 | B2 | 11/2013 | Atamna et al. |
| 8,676,721 | B2 | 3/2014 | Piovesan et al. |
| 8,761,910 | B1 | 6/2014 | Chapman, Jr. et al. |
| 8,761,911 | B1 | 6/2014 | Chapman et al. |
| 8,761,912 | B1 | 6/2014 | Chapman, Jr. et al. |
| 8,781,743 | B2 | 7/2014 | McKay et al. |
| 8,819,652 | B2 | 8/2014 | Zingelewicz et al. |
| 8,825,567 | B2 | 9/2014 | Jiang et al. |
| 8,898,525 | B2 | 11/2014 | Loganathan et al. |
| 8,978,699 | B2 | 3/2015 | Jaffrey et al. |
| 9,053,468 | B2 | 6/2015 | Haynes et al. |
| 9,110,452 | B2 | 8/2015 | Blevins et al. |
| 9,163,471 | B2 | 10/2015 | Coonrod et al. |
| 9,187,974 | B2 | 11/2015 | Coonrod et al. |
| 9,322,247 | B2 | 4/2016 | Rojas et al. |
| 9,410,392 | B2 | 8/2016 | Jaffrey et al. |
| 9,546,545 | B2 | 1/2017 | Cardellini et al. |
| 9,633,067 | B2 | 4/2017 | Maddock |
| 9,634,581 | B2 | 4/2017 | Jaffrey |
| 9,658,130 | B2 | 5/2017 | Veeningen |
| 9,677,573 | B2 | 6/2017 | Jaffrey |
| 9,732,879 | B2 | 8/2017 | Jaffrey |
| 9,804,039 | B2 | 10/2017 | Reyes, III et al. |
| 9,933,919 | B2 | 4/2018 | Raja et al. |
| 9,934,338 | B2 | 4/2018 | Germain et al. |
| 9,934,479 | B2 | 4/2018 | Sanchez et al. |
| 9,964,135 | B2 | 5/2018 | Jaffrey et al. |
| 9,970,569 | B2 | 5/2018 | Kotrla et al. |
| 9,988,870 | B2 | 6/2018 | Gray |
| 10,049,474 | B2 | 8/2018 | Germain et al. |
| 10,087,745 | B2 | 10/2018 | Gottlieb et al. |
| 10,151,160 | B2 | 12/2018 | Jaffrey et al. |
| 10,161,225 | B2 | 12/2018 | Jaffrey et al. |
| 10,161,226 | B2 | 12/2018 | Bagnaro |
| 10,175,287 | B2 | 1/2019 | Jaffrey et al. |
| 10,209,400 | B2 | 2/2019 | Bermudez Martinez et al. |
| 10,215,009 | B2 | 2/2019 | Tjostheim et al. |
| 10,221,674 | B2 | 3/2019 | Samuel |
| 10,246,994 | B2 | 4/2019 | Jaffrey |
| 10,248,141 | B2 | 4/2019 | McKeon et al. |
| 10,256,676 | B2 | 4/2019 | Gray |
| 10,260,332 | B2 | 4/2019 | Israel et al. |
| 10,273,752 | B2 | 4/2019 | Mebane, III |
| 10,273,774 | B2 | 4/2019 | Jaffrey |
| 10,287,869 | B2 | 5/2019 | Jaffrey |
| 10,294,770 | B2 | 5/2019 | Anghelescu et al. |
| 10,301,923 | B2 | 5/2019 | Andresen et al. |
| 10,329,875 | B2 | 6/2019 | Reyes, III et al. |
| 10,392,918 | B2 | 8/2019 | Harkless et al. |
| 10,392,924 | B2 | 8/2019 | Gray |
| 10,400,586 | B2 | 9/2019 | Bittar et al. |
| 10,408,641 | B2 | 9/2019 | Gaude |
| 10,502,021 | B2 | 12/2019 | Healy |
| 10,513,920 | B2 | 12/2019 | Salminen et al. |
| 10,539,001 | B2 | 1/2020 | Kpetehoto et al. |
| 10,570,689 | B2 | 2/2020 | Jaffrey |
| 10,579,231 | B1 * | 3/2020 | Valleru ................ G06F 3/0482 |
| 10,648,317 | B2 | 5/2020 | Dykstra et al. |
| 10,685,335 | B2 | 6/2020 | Buca et al. |
| 10,769,323 | B2 | 9/2020 | Camacho Cardenas |
| 10,782,677 | B2 | 9/2020 | Zheng et al. |
| 10,782,679 | B2 | 9/2020 | Zheng et al. |
| 2004/0133397 | A1 * | 7/2004 | Bjornson ........... G05B 23/0278 |
| | | | 702/185 |
| 2011/0272144 | A1 * | 11/2011 | Belcher ................. E21B 47/12 |
| | | | 166/250.01 |
| 2014/0074260 | A1 | 3/2014 | Schroeder et al. |
| 2014/0182381 | A1 | 7/2014 | Comeaux et al. |
| 2014/0231075 | A1 | 8/2014 | Springett et al. |
| 2015/0022326 | A1 | 1/2015 | Baxter et al. |
| 2015/0294048 | A1 | 10/2015 | Jones |
| 2016/0131692 | A1 | 5/2016 | Jaffrey |
| 2016/0168979 | A1 | 6/2016 | Zhang et al. |
| 2016/0179751 | A1 | 6/2016 | Korjani et al. |
| 2016/0186516 | A1 | 6/2016 | Jaffrey |
| 2016/0217379 | A1 | 7/2016 | Patri et al. |
| 2016/0237773 | A1 | 8/2016 | Dalton et al. |
| 2016/0274551 | A1 | 9/2016 | Mishra et al. |
| 2016/0292652 | A1 | 10/2016 | Bowden, Jr. et al. |
| 2016/0371957 | A1 | 12/2016 | Ghaffari et al. |
| 2017/0074067 | A1 | 3/2017 | Jaffrey et al. |
| 2017/0268323 | A1 | 9/2017 | Dykstra et al. |
| 2018/0142543 | A1 | 5/2018 | Gupta et al. |
| 2018/0149010 | A1 | 5/2018 | Zheng et al. |
| 2018/0328159 | A1 | 11/2018 | Mandava et al. |
| 2018/0363421 | A1 | 12/2018 | Harshbarger et al. |
| 2019/0033845 | A1 | 1/2019 | Cella et al. |
| 2019/0094840 | A1 * | 3/2019 | Zheng ..................... G06F 21/33 |
| 2019/0120023 | A1 | 4/2019 | Ocegueda-Hernandez et al. |
| 2019/0264545 | A1 | 8/2019 | Camacho Cardenas et al. |
| 2020/0003611 | A1 | 1/2020 | Turner et al. |
| 2020/0123878 | A1 | 4/2020 | Yepez |
| 2020/0347714 | A1 | 11/2020 | Kilic et al. |
| 2020/0399988 | A1 | 12/2020 | Camacho Cardenas et al. |
| 2021/0198980 | A1 | 7/2021 | Zapico et al. |

FOREIGN PATENT DOCUMENTS

| | | | |
|---|---|---|---|
| WO | 2020018492 | A1 | 1/2020 |
| WO | 2020028199 | A1 | 2/2020 |
| WO | 2020086680 | A1 | 4/2020 |

* cited by examiner

MONITORING AND DIAGNOSIS OF EQUIPMENT HEALTH

BACKGROUND OF THE DISCLOSURE

Wells are generally drilled into the ground or ocean bed to recover natural deposits of oil, gas, and other materials that are trapped in subterranean formations. Well construction (e.g., drilling) operations may be performed at a wellsite by a well construction system (e.g., a drilling rig) having various surface and subterranean well construction equipment operating in a coordinated manner. For example, a drive mechanism, such as a top drive located at a wellsite surface, can be utilized to rotate and advance a drill string into a subterranean rock formation to drill a wellbore. The drill string may include a plurality of drill pipes coupled together and terminating with a drill bit. Length of the drill string may be increased by adding additional drill pipes while depth of the wellbore increases. Drilling fluid may be pumped from the wellsite surface down through the drill string to the drill bit. The drilling fluid lubricates and cools the drill bit and carries drill cuttings from the wellbore back to the wellsite surface. The drilling fluid returning to the surface may then be cleaned and again pumped through the drill string. The well construction equipment of the well construction system may be grouped into various subsystems, wherein each subsystem performs a different operation.

The success of the well construction operations may be related to many factors, including failure rates. Due to high pressures, high forces, and high frequency of use, certain pieces of the well construction equipment can wear out and fail. Equipment wear and impending failures are often detected late, resulting in operational stoppages and severe damage to the equipment. Operational interruptions may reduce efficiency of the well construction operations and delay completion of the well. Such consequences make equipment health diagnosis, preemptive equipment maintenance, and timely detection of failures a high priority in the oil and gas industry.

Some health monitoring systems do not accurately diagnose equipment health problems or provide maintenance personnel with sufficient information to quickly and efficiently locate and repair such equipment health problems. Some health monitoring systems do not prioritize or otherwise distinguish between minor and major maintenance problems. Some health monitoring systems generate the same equipment health notification (e.g., alert) for both minor and major maintenance problems. Such health monitoring systems may thus cause the maintenance personnel to interrupt well construction operations to perform unnecessary maintenance to address minor maintenance problems, dedicate the same amount of time to diagnose both minor and major maintenance problems, and mitigate minor operational deviations before impending equipment failures.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a monitoring system of a well construction system. The well construction system is located at a wellsite and includes pieces of equipment operable to perform well construction operations. The monitoring system includes sensors each disposed in association with a corresponding piece of equipment and operable to facilitate sensor data indicative of operational status of that piece of equipment. The monitoring system also includes a first communication device, a second communication device, and a monitoring device that includes a processor and a memory storing an executable program code. During the well construction operations, the monitoring device is operable to receive the sensor data, detect an abnormal condition associated with a corresponding piece of equipment based on the sensor data, and output abnormal condition information indicative of the abnormal condition to the first communication device. The first communication device is operable to display the abnormal condition information to technical support personnel, receive from the technical support personnel mitigation information indicative of action to be performed by maintenance personnel to mitigate the abnormal condition, and output the mitigation information to the second communication device for viewing by the maintenance personnel.

The present disclosure also introduces a method that includes commencing operation of a monitoring system of a well construction system. The well construction system is located at a wellsite and includes pieces of equipment operable to perform well construction operations. Commencing operation of the monitoring system causes the monitoring system to receive sensor data facilitated by sensors each disposed in association with a corresponding piece of equipment, detect an abnormal condition associated with a piece of equipment based on the sensor data, and output abnormal condition information indicative of the abnormal condition to a first communication device. The method also includes displaying the abnormal condition information to technical support personnel via the first communication device. The method also includes receiving, by the first communication device and from the technical support personnel, mitigation information indicative of mitigating action to be performed to mitigate the abnormal condition. The method also includes transmitting the mitigation information from the first communication device to a second communication device to be viewed by maintenance personnel who are to perform the mitigating action.

The present disclosure also introduces a method including commencing operation of a monitoring system of a well construction system. The well construction system is located at a wellsite and comprises pieces of equipment operable to perform well construction operations. Commencing operation of the monitoring system causes the monitoring system to receive sensor data facilitated by sensors each disposed in association with a corresponding piece of equipment, output an alert indicative of an abnormal condition associated with a piece of equipment based on the sensor data, and transmit the alert and abnormal condition sensor data associated with the piece of equipment associated with the abnormal condition to a first communication device located at a location remote from the wellsite. The method also includes displaying the alert and abnormal condition sensor data to technical support personnel on the first communication device. The method also includes receiving, by the first communication device and from the technical support personnel, mitigation information indicative of mitigating action to be performed to mitigate the abnormal condition. The method also includes transmitting the mitigation information from the first communication device to a second communication device located at the wellsite to be viewed by maintenance personnel who are to perform the mitigating action.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
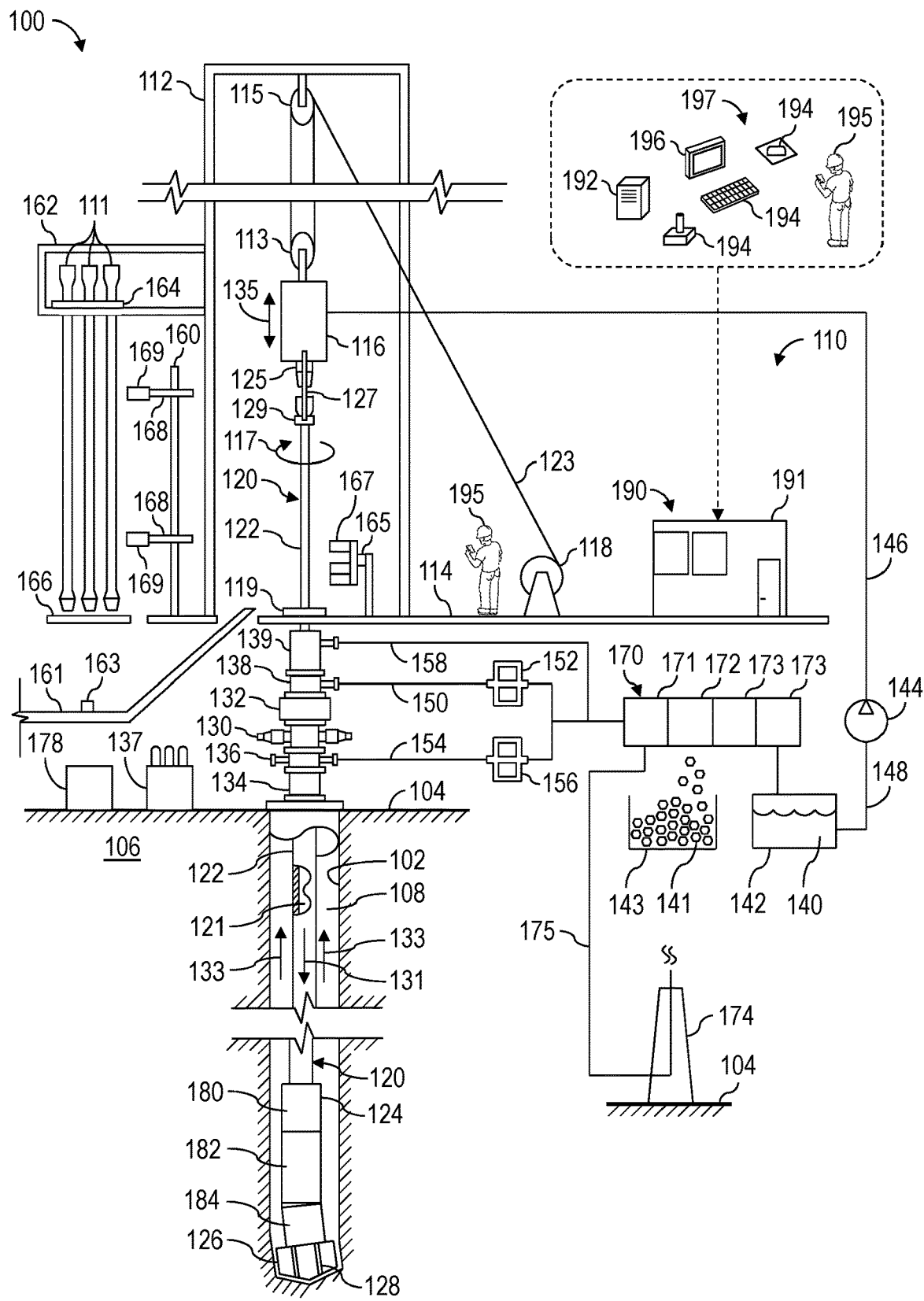
FIG. 1 is a schematic side view of at least a portion of an example implementation of apparatus according to one or more aspects of the present disclosure.

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

Systems and methods (e.g., processes, operations, etc.) according to one or more aspects of the present disclosure may be utilized or otherwise implemented in association with an automated well construction system (i.e., a well construction rig) at an oil and gas wellsite, such as for constructing a wellbore for extracting hydrocarbons (e.g., oil and/or gas) from a subterranean formation. However, one or more aspects of the present disclosure may be utilized or otherwise implemented in association with other automated systems in the oil and gas industry and other industries. For example, one or more aspects of the present disclosure may be implemented in association with wellsite systems for performing fracturing, cementing, acidizing, chemical injecting, and/or water jet cutting operations, among other examples. One or more aspects of the present disclosure may also be implemented in association with mining sites, building construction sites, and/or other work sites where automated machines or equipment are utilized.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a well construction (e.g., drilling) rig. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 comprises various well construction equipment (i.e., wellsite equipment), including surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise a plurality of interconnected tubulars, such as drill pipe, heavy-weight drill pipe (HWDP), wired drill pipe (WDP), tough logging condition (TLC) pipe, and drill collars, among other examples. The conveyance means 122 may instead comprise coiled tubing for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor 184 connected with the drill bit 126. The BHA 124 may also include various downhole devices and/or tools 180, 182.

The support structure 112 may support a driver, such as a top drive 116, operable to connect (perhaps indirectly) with an upper end of the drill string 120, and to impart rotary motion 117 and vertical motion 135 to the drill string 120, including the drill bit 126. However, another driver, such as a kelly and rotary table (neither shown), may be utilized instead of or in addition to the top drive 116 to impart the rotary motion 117 to the drill string 120. The top drive 116 and the connected drill string 120 may be suspended from the support structure 112 via a hoisting system or equipment, which may include a traveling block 113, a crown block 115, and a drawworks 118 storing a support cable or line 123. The crown block 115 may be connected to or otherwise supported by the support structure 112, and the traveling block 113 may be coupled with the top drive 116. The drawworks 118 may be mounted on or otherwise supported by the rig floor 114. The crown block 115 and traveling block 113 comprise pulleys or sheaves around which the support line 123 is reeved to operatively connect the crown block 115, the traveling block 113, and the drawworks 118 (and perhaps an anchor). The drawworks 118 may thus selectively impart tension to the support line 123 to lift and lower the top drive 116, resulting in the vertical motion 135. The drawworks 118 may comprise a drum, a base, and a prime mover (e.g., an electric motor) (not shown) operable to drive the drum to rotate and reel in the support line 123, causing the traveling block 113 and the top drive 116 to move upward. The drawworks 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (e.g., an electric motor) (not shown), such as via a gear box or transmission (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the drawworks 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The drill string 120 may be conveyed within the wellbore 102 through various fluid control devices disposed at the wellsite surface 104 on top of the wellbore 102 and perhaps below the rig floor 114. The fluid control devices may be operable to control fluid within the wellbore 102. The fluid control devices may include a blowout preventer (BOP) stack 130 for maintaining well pressure control comprising a series of pressure barriers (e.g., rams) between the wellbore 102 and an annular preventer 132. The fluid control devices may also include a rotating control device (RCD) 138 mounted above the annular preventer 132. The fluid control devices 130, 132, 138 may be mounted on top of a wellhead 134. A power unit 137 (i.e., a BOP control or closing unit) may be operatively connected with one or more of the fluid control devices 130, 132, 138 and operable to actuate, drive, operate, or otherwise control one or more of the fluid control devices 130, 132, 138. The power unit 137 may be or comprise a hydraulic fluid power unit fluidly connected with the fluid control devices 130, 132, 138 and selectively operable to hydraulically drive various portions (e.g., rams, valves, seals) of the fluid control devices 130, 132, 138. The power unit 137 may comprise one or more hydraulic pumps actuated by electric motors and operable to pressurize hydraulic fluid for operating the fluid control devices 130, 132, 138 as described herein.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid 140 (i.e., drilling mud), and one or more mud pump units 144 (i.e., drilling fluid pumps) operable to move the drilling fluid 140 from the container 142 into the fluid passage 121 of the drill string 120 via a fluid conduit 146 extending from the pump units 144 to the top drive 116 and an internal passage extending through the top drive 116. Each pump unit 144 may comprise a fluid pump (not shown) operable to pump the drilling fluid 140 and a prime mover (e.g., an electric motor) (not shown) operable to drive the corresponding fluid pump. The fluid conduit 146 may comprise one or more of a pump discharge line, a stand pipe, a rotary hose, and a gooseneck connected with a fluid inlet of the top drive 116. The pumps 144 and the container 142 may be fluidly connected by a fluid conduit 148, such as a suction line.

During drilling operations, the drilling fluid may continue to flow downhole through the internal passage 121 of the drill string 120, as indicated by directional arrow 131. The drilling fluid may exit the BHA 124 via ports 128 in the drill bit 126 and then circulate uphole through an annular space 108 ("annulus") of the wellbore 102 defined between an exterior of the drill string 120 and the wall of the wellbore 102, such flow being indicated by directional arrows 133. In this manner, the drilling fluid lubricates the drill bit 126 and carries formation cuttings uphole to the wellsite surface 104. The returning drilling fluid may exit the annulus 108 via different fluid control devices during different stages or scenarios of well drilling operations. For example, the drilling fluid may exit the annulus 108 via a bell nipple 139, the RCD 138, or a ported adapter 136 (e.g., a spool, cross adapter, a wing valve, etc.) located below one or more rams of the BOP stack 130.

During normal drilling operations, the drilling fluid may exit the annulus 108 via the bell nipple 139 and then be directed toward drilling fluid reconditioning equipment 170 via a fluid conduit 158 (e.g., gravity return line) to be cleaned and/or reconditioned, as described below, before being returned to the container 142 for recirculation. During managed pressure drilling operations, the drilling fluid may exit the annulus 108 via the RCD 138 and then be directed into a choke manifold 152 (e.g., a managed pressure drilling choke manifold) via a fluid conduit 150 (e.g., a drilling pressure control line). The choke manifold 152 may include at least one choke and a plurality of fluid valves (neither shown) collectively operable to control the flow through and out of the choke manifold 152. Backpressure may be applied to the annulus 108 by variably restricting flow of the drilling fluid or other fluids flowing through the choke manifold 152. The greater the restriction to flow through the choke manifold 152, the greater the backpressure applied to the annulus 108. The drilling fluid exiting the choke manifold 152 may then pass through the drilling fluid reconditioning equipment 170 before being returned to the container 142 for recirculation. During well pressure control operations, such as when one or more rams of the BOP stack 130 is closed, the drilling fluid may exit the annulus 108 via the ported adapter 136 and be directed into a choke manifold 156 (e.g., a rig choke manifold, well control choke manifold) via a fluid conduit 154 (e.g., rig choke line). The choke manifold 156 may include at least one choke and a plurality of fluid valves (neither shown) collectively operable to control the flow of the drilling fluid through the choke manifold 156. Backpressure may be applied to the annulus 108 by variably restricting flow of the drilling fluid (and other fluids) flowing through the choke manifold 156. The drilling fluid exiting the choke manifold 156 may then pass through the drilling fluid reconditioning equipment 170 before being returned to the container 142 for recirculation.

Before being returned to the container 142, the drilling fluid returning to the wellsite surface 104 may be cleaned and/or reconditioned via the drilling fluid reconditioning equipment 170, which may include one or more of liquid gas (i.e., mud gas) separators 171, shale shakers 172, and other drilling fluid cleaning and reconditioning equipment 173. The liquid gas separators 171 may remove formation gasses entrained in the drilling fluid discharged from the wellbore 102 and the shale shakers 172 may separate and remove solid particles 141 (e.g., drill cuttings) from the drilling fluid. The drilling fluid reconditioning equipment 170 may further comprise other equipment 173 operable to remove additional gas and finer formation cuttings from the drilling fluid and/or modify chemical and/or physical properties or characteristics (e.g., rheology, density) of the drilling fluid. For example, the drilling fluid reconditioning equipment 170 may include a degasser, a desander, a desilter, a centrifuge, a mud cleaner, and/or a decanter, among other examples. The drilling fluid reconditioning equipment 170 may further include chemical containers and mixing equipment collectively operable to mix or otherwise add selected chemicals to the drilling fluid returning from the wellbore 102 to modify chemical and/or physical properties or characteristics of the drilling fluid being pumped back into the wellbore 102. Intermediate tanks/containers (not shown) may be utilized to hold the drilling fluid while the drilling fluid progresses through the various stages or portions 171, 172, 173 of the drilling fluid reconditioning equipment 170. The cleaned and reconditioned drilling fluid may be transferred to the fluid container 142, the solid particles 141 removed from the drilling fluid may be transferred to a solids container 143 (e.g., a reserve pit), and/or the removed gas may be transferred to a flare stack 174 via a conduit 175 (e.g., a flare line) to be burned or to a container (not shown) for storage and removal from the wellsite.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 161 may be utilized to convey tubulars from a ground level, such as along the wellsite surface 104, to the rig floor 114, permitting the elevator 129 to grab and lift the tubulars above the wellbore 102 for connection with previously deployed tubulars. The catwalk 161 may have a horizontal portion and an inclined portion that extends between the horizontal portion and the rig floor 114. The catwalk 161 may comprise a skate 163 movable along a groove (not shown) extending longitudinally along the horizontal and inclined portions of the catwalk 161. The skate 163 may be operable to convey (e.g., push) the tubulars along the catwalk 161 to the rig floor 114. The skate 163 may be driven along the groove by a drive system (not shown), such as a pulley system or a hydraulic system. Additionally, one or more racks (not shown) may adjoin the horizontal portion of the catwalk 161. The racks may have a spinner unit for transferring tubulars to the groove of the catwalk 161. The tubular handling system may comprise a plurality of actuators collectively operable to move various portions of the tubular handling equipment to perform the methods and operations described herein. The actuators may be or comprise electric motors and/or hydraulic cylinders and rotary actuators. The hydraulic cylinders and rotary actuators may be powered by hydraulic power packs comprising hydraulic pumps actuated by electric motors to pressurize hydraulic fluid.

An iron roughneck 165 may be positioned on the rig floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations. The spinner of the iron roughneck 165 may be utilized to apply low torque to make up and break out threaded connections between tubulars of the drill string 120, and the torque wrench may be utilized to apply a higher torque to tighten and loosen the threaded connections. The iron roughneck may comprise a plurality of actuators collectively operable to move various portions of the iron roughneck to perform the methods and operations described herein. The actuators may be or comprise electric motors.

A set of slips 119 may be located on the rig floor 114, such as may accommodate therethrough the drill string 120 during tubular make up and break out operations and during the drilling operations. The slips 119 may be in an open position during drilling operations to permit advancement of the drill string 120, and in a closed position to clamp the upper end (e.g., the uppermost tubular) of the drill string 120 to thereby suspend and prevent advancement of the drill string 120 within the wellbore 102, such as during the make up and break out operations.

During drilling operations, the various well construction equipment of the well construction system 100 may progress through a plurality of coordinated operations (i.e., operational sequences) to drill or otherwise construct the wellbore 102. The operational sequences may change based on a well construction plan, status of the well, status of the subterranean formation, stage of drilling operations (e.g., tripping, drilling, tubular handling, etc.), and type downhole tubulars (e.g., drill pipe) utilized, among other examples.

During drilling operations, the hoisting system lowers the drill string 120 while the top drive 116 rotates the drill string 120 to advance the drill string 120 downward within the wellbore 102 and into the formation 106. During the advancement of the drill string 120, the slips 119 are in an open position, and the iron roughneck 165 is moved away or is otherwise clear of the drill string 120. When the upper end of the drill string 120 (i.e., upper end of the uppermost tubular of the drill string 120) connected to the drive shaft 125 is near the slips 119 and/or the rig floor 114, the top drive 116 ceases rotating and the slips 119 close to clamp the upper end of the drill string 120. The grabber of the top drive 116 then clamps the uppermost tubular connected to the drive shaft 125, and the drive shaft 125 rotates in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 161 and individual tubulars may be transferred from the rack to the groove in the catwalk 161, such as by the spinner unit. The tubular positioned in the groove may be conveyed along the groove by the skate 163 until the box end of the tubular projects above the rig floor 114. The elevator 129 of the top drive 116 then grasps the protruding box end, and the drawworks 118 may be operated to lift the top drive 116, the elevator 129, and the new tubular.

The hoisting system then raises the top drive 116, the elevator 129, and the new tubular until the tubular is aligned with the upper portion of the drill string 120 clamped by the slips 119. The iron roughneck 165 is moved toward the drill string 120, and the lower tong of the torqueing portion 167 clamps onto the upper end of the drill string 120. The spinning system threadedly connects the lower end (i.e., pin end) of the new tubular with the upper end (i.e., box end) of the drill string 120. The upper tong then clamps onto the new tubular and rotates with high torque to complete making up the connection with the drill string 120. In this manner, the new tubular becomes part of the drill string 120. The iron roughneck 165 then releases and moves clear of the drill string 120.

The grabber of the top drive 116 may then clamp onto the drill string 120. The drive shaft 125 is brought into contact with the upper end of the drill string 120 (e.g., the box end of the uppermost tubular) and rotated to make up a connection between the drill string 120 and the drive shaft 125. The grabber then releases the drill string 120, and the slips 119 are moved to the open position. The drilling operations may then resume.

The tubular handling equipment may further include a tubular handling manipulator (THM) 160 disposed in association with a vertical pipe rack 162 for storing tubulars 111 (e.g., drill pipes, drill collars, drill pipe stands, casing joints, etc.). The vertical pipe rack 162 may comprise or support a fingerboard 164 defining a plurality of slots configured to support or otherwise hold the tubulars 111 within or above a setback 166 (e.g., a platform or another area) located adjacent to, along, or below the rig floor 114. The fingerboard 164 may comprise a plurality of fingers (not shown), each associated with a corresponding slot and operable to close around and/or otherwise interpose individual tubulars 111 to maintain the tubulars 111 within corresponding slots of the fingerboard 164. The vertical pipe rack 162 may be connected with and supported by the support structure 112 or another portion of the wellsite system 100. The fingerboard 164/setback 166 provide storage (e.g., temporary storage) of tubulars 111 during various operations, such as during and between tripping out and tripping of the drill string 120. The THM 160 may comprise a plurality of actuators collectively operable to move various portions of the THM 160 to perform the methods and operations described herein. The actuators may be or comprise electric motors.

The THM 160 may be operable to transfer the tubulars 111 between the fingerboard 164/setback 166 and the drill string 120 (i.e., space above the suspended drill string 120). For example, the THM 160 may include arms 168 terminating with clamps 169, such as may be operable to grasp and/or clamp onto one of the tubulars 111. The arms 168 of the THM 160 may extend and retract, and/or at least a portion of the THM 160 may be rotatable and/or movable toward and away from the drill string 120, such as may permit the THM 160 to transfer the tubular 111 between the fingerboard 164/setback 166 and the drill string 120.

To trip out the drill string 120, the top drive 116 is raised, the slips 119 are closed around the drill string 120, and the elevator 129 is closed around the drill string 120. The grabber of the top drive 116 clamps the upper end of a tubular of the drill string 120 coupled to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 165 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 165 then releases the drill string 120 and moves clear of the drill string 120.

The THM 160 may then move toward the drill string 120 to grasp the tubular suspended from the elevator 129. The elevator 129 then opens to release the tubular. The THM 160 then moves away from the drill string 120 while grasping the tubular with the clamps 169, places the tubular in the fingerboard 164/setback 166, and releases the tubular for storage. This process is repeated until the intended length of drill string 120 is removed from the wellbore 102.

The well construction system 100 may further comprise a power supply system 178 configured to supply electrical and mechanical (e.g., fluid) power for actuating or otherwise powering the surface equipment 110. The power supply system 178 may include one or more electric generators, electrical energy storage devices (e.g., batteries, capacitors), and fuel storage devices, among other examples. The power supply system 178 may also include various means (not shown) for transferring and/or distributing electrical power, mechanical power, and fuel to the well construction equipment and between various pieces of equipment of the power supply system 178, including electrical power conductors, electrical connectors, electrical relays, fluid conductors, fluid connectors, and fluid valves, among other examples.

The surface equipment 110 of the well construction system 100 may also comprise a control center 190 from which various portions of the well construction system 100, such as the top drive 116, the hoisting system, the tubular handling system, the drilling fluid circulation system, the well control system, and the BHA 124, among other examples, may be monitored and controlled. The control center 190 may be located on the rig floor 114 or another location of the well construction system 100. The control center 190 may comprise a facility 191 (e.g., a room, a cabin, a trailer, etc.) containing a control workstation 197, which may be operated by rig personnel 195 (e.g., a driller or another human rig operator) to monitor and control various well construction equipment or portions of the well construction system 100. The control workstation 197 may comprise or be communicatively connected with a central controller 192 (e.g., a processing device, a computer, etc.), such as may be operable to receive, process, and output information to monitor operations of and provide control to one or more portions of the well construction system 100. For example, the central controller 192 may be communicatively connected with the various surface and downhole equipment described herein, and may be operable to receive signals from and transmit signals to such equipment to perform various operations described herein. The central controller 192 may store executable computer program code, instructions, and/or operational parameters or setpoints, including for implementing one or more aspects of methods and operations described herein. The central controller 192 may be located within and/or outside of the facility 191. Although it is possible that the entirety of the central controller 192 is implemented within one device, it is also contemplated that one or more components or functions of the central controller 192 may be implemented across multiple devices, some or an entirety of which may be implemented as part of the control center 190 and/or located within the facility 191.

The control workstation 197 may be operable for entering or otherwise communicating control data (e.g., commands, signals, information, etc.) to the central controller 192 and other equipment controller by the rig personnel 195, and for displaying or otherwise communicating information from the central controller 192 to the rig personnel 195. The control workstation 197 may comprise one or more input devices 194 (e.g., a keyboard, a mouse, a joystick, a touchscreen, etc.) and one or more output devices 196 (e.g., a video monitor, a touchscreen, a printer, audio speakers, etc.). Communication between the central controller 192, the input and output devices 194, 196, and the various well construction equipment may be via wired and/or wireless communication means. However, for clarity and ease of understanding, such communication means are not depicted, and a person having ordinary skill in the art will appreciate that such communication means are within the scope of the present disclosure.

The well construction system 100 within the scope of the present disclosure may include more or fewer components than as described above and depicted in FIG. 1. Namely, the various equipment and/or subsystems of the well construction system 100 shown in FIG. 1 may include more or fewer components than as described above and depicted in FIG. 1. For example, various local equipment controllers, sensors, fluid valves, fluid conductors, hydraulics, electrical switches, electrical conductors, actuators, engines, electric motors, and/or other equipment and components not explicitly described herein may be included in the well construction system 100, and are within the scope of the present disclosure.

Figure 2:
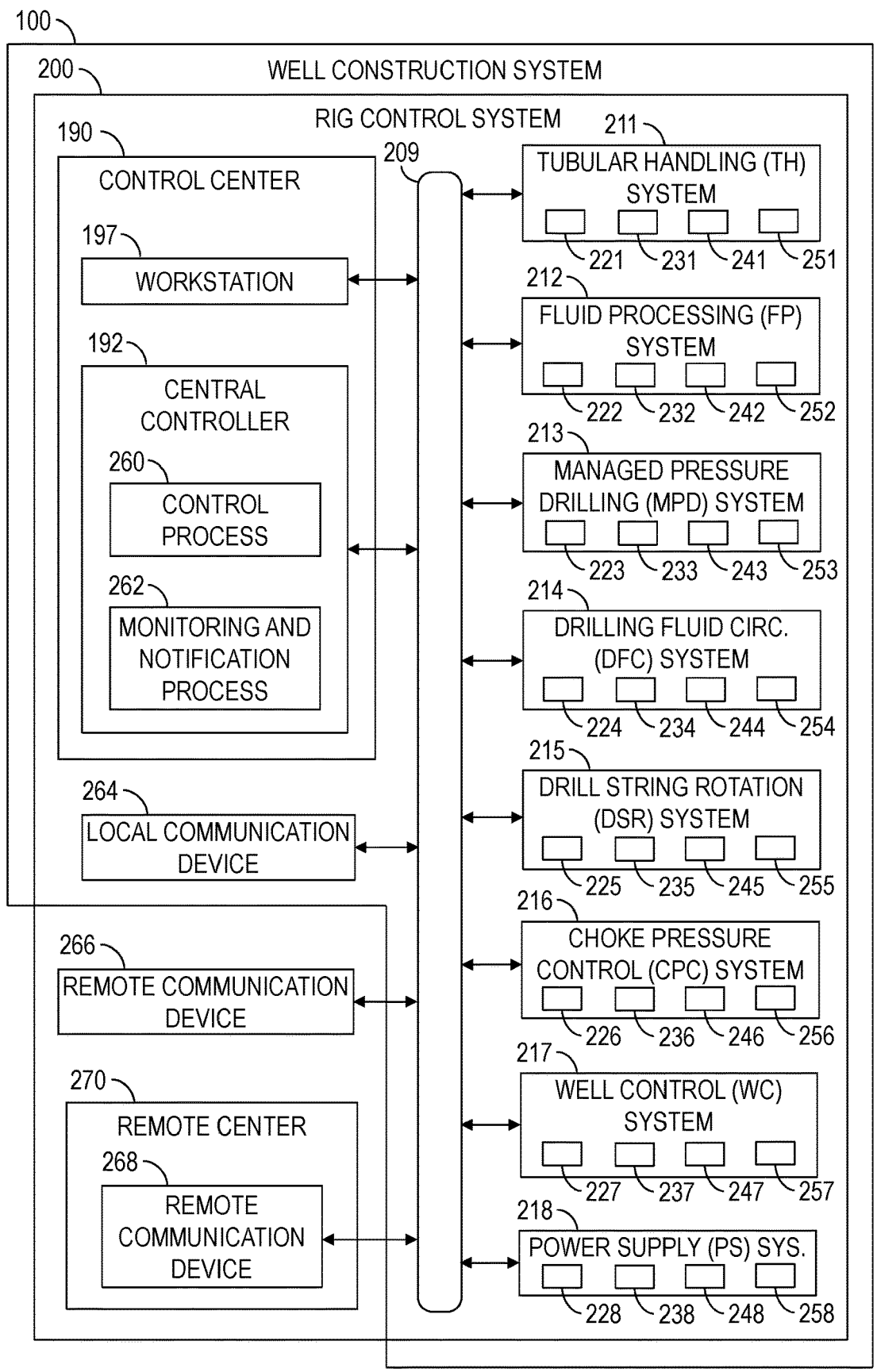
FIG. 2 is a schematic view of at least a portion of an example implementation of apparatus according to one or more aspects of the present disclosure.

The present disclosure further provides various implementations of systems and/or methods for monitoring and controlling one or more portions of the well construction system 100. FIG. 2 is a schematic view of at least a portion of an example implementation of a drilling rig monitoring and control system 200 (hereinafter "rig control system") for monitoring and controlling various well construction equipment of the well construction system 100 shown in FIG. 1. The rig control system 200 may comprise one or more features of the well construction system 100, including where indicated by the same reference numerals. Accordingly, the following description refers to FIGS. 1 and 2, collectively.

The rig control system 200 may be in real-time communication with, and utilized to monitor and/or control, various portions, components, and equipment of the well construction system 100 described herein. The equipment of the well construction system 100 may be grouped into several subsystems, each operable to perform a corresponding operation and/or a portion of the well construction operations described herein. The subsystems may include a tubular handling (TH) system 211, a fluid processing (FP) system 212, a managed pressure drilling (MPD) system 213, a drilling fluid circulation (DFC) system 214, a drill string rotation system (DSR) system 215, a choke pressure control (CPC) system 216, a well pressure control (WC) system 217, and a power supply (PS) system 218.

The TH system 211 may include the support structure 112, a tubular hoisting system (e.g., the drawworks 118, the elevator links 127, the elevator 129, the slips 119), a tubular handling system or equipment (e.g., the catwalk 161, the THM 160, the setback 166, and the iron roughneck 165), and/or other tubular handling equipment. Accordingly, the TH system 211 may perform tubular handling and hoisting operations. The TH system 211 may also serve as a support platform for tubular rotation equipment and staging ground for rig operations, such as connection make up and break out operations described above. The FP system 212 may include the drilling fluid reconditioning equipment 170, the flare stack 174, the containers 142, 143, and/or other equipment. Accordingly, the FP system 212 may perform fluid cleaning, reconditioning, and mixing operations. The MPD system 213 may include the RCD 138, the power unit 137, the choke manifold 152, and/or other equipment. The DFC system 214 may comprise the pumps 144, the drilling fluid container 142, the bell nipple 139, and/or other equipment collectively operable to pump and circulate the drilling fluid at the wellsite surface and downhole. The DSR system 215 may include the top drive 116 and/or the rotary table and kelly. The CPC system 216 may comprise the choke manifold 156, the ported adapter 136, and/or other equipment, and the WC system 217 may comprise the BOP stack 130, the power unit 137, and a BOP control station for controlling the power unit 137. The PS system 218 may be or comprise the power supply system 178. The PS system 218 may comprise various sources of electrical power operable to actuator or otherwise power the well construction equipment of the well construction system 100, including the well construction equipment of the well construction subsystems 211-217. The PS system 218 may also include various means for transferring and/or distributing electrical power and fuel to the well construction equipment and between various pieces of equipment of the PS system 218, including electrical power conductors, electrical connectors, electrical relays, fluid conductors, fluid connectors, and fluid valves, among other examples. The sources of electrical power may include electric generators, electrical energy storage devices (e.g., batteries, capacitors), fuel storage devices, and a remote electrical power grid, among other examples. Each of the well construction subsystems 211-218 may further comprise various communication equipment (e.g., modems, network interface cards, etc.) and communication conductors (e.g., cables), communicatively connecting the equipment (e.g., sensors and actuators) of each subsystem 211-218 with a central controller 192 and a control workstation 197. Although the well construction equipment listed above and shown in FIG. 1 is associated with certain wellsite subsystems 211-218, such associations are merely examples that are not intended to limit or prevent such well construction equipment from being associated with two or more wellsite subsystems 211-218 and/or different wellsite subsystems 211-218.

The rig control system 200 may include various local controllers 221-228, each operable to control various well construction equipment of a corresponding subsystem 211-218 and/or an individual piece of well construction equipment of a corresponding subsystem 211-218. Each well construction subsystem 211-218 includes various well construction equipment comprising corresponding actuators 241-248 for performing operations of the well construction system 100. Each subsystem 211-218 may include various sensors 231-238 operable to output or otherwise facilitate sensor data (e.g., signals, information, measurements) indicative of operational status of the well construction equipment of each subsystem 211-218. Each local controller 221-228 may output control data (e.g., commands, signals, information) to one or more actuators 241-248 to cause the actuators 241-248 to perform corresponding actions of a piece of equipment or subsystem 211-218. Each local controller 221-228 may receive sensor data output by one or more sensors 231-238 indicative of operational status of an actuator or another portion of a piece of equipment of a corresponding subsystem 211-218.

Each subsystem 211-218 may further include one or more corresponding local human-machine interfaces (HMIs) 251-258 usable by rig personnel (e.g., equipment maintenance personnel) to configure, monitor, and control corresponding well construction equipment of that subsystem 211-218. Each local HMI 251-258 may be installed in association with a corresponding piece of well construction equipment or subsystem 211-218 and communicatively connected with a corresponding local controller 221-228, sensors 231-238, and/or actuators 241-248. Each HMI 251-258 may be operable for entering or otherwise communicating control data to the corresponding local controller 221-228 by the rig personnel for controlling corresponding well construction equipment and/or subsystem 211-218.

Each HMI 251-258 may be further operable for displaying or otherwise communicating sensor data from the sensors 231-238 and other information to the rig personnel, thereby permitting the rig personnel to monitor operational status of the corresponding well construction equipment and/or subsystem 211-218. For example, each HMI 221-228 may be operable to display one or more operational status and configuration HMI screens usable by the rig personnel to configure operational parameters of the corresponding well construction equipment and/or subsystem 211-218. Each HMI screen may display sensor data output by corresponding sensors 231-238. Each HMI screen may display current operational set-points, display various operational set-points that may be changed or selected by the rig personnel, and/or may permit operational set-points to be entered via an input device. Each HMI screen may be a native HMI screen generated by a corresponding local controller 221-228 running or otherwise executing a native computer program code to operate or control the corresponding piece of equipment and/or subsystem 211-218.

Each HMI 251-258 may be or comprise a control workstation, a terminal, a computer, or another device comprising one or more input devices (e.g., a keyboard, a mouse, a joystick, a touchscreen, etc.) and one or more output devices (e.g., a video monitor, a touchscreen, a printer, audio speakers, etc.). Each HMI 251-258 may be physically installed in association with a corresponding subsystem 211-218 or a piece of well construction equipment of the corresponding subsystem 211-218. Communication between each HMI 251-258 and a corresponding local controller 221-228 may be via wired and/or wireless communication means. However, for clarity and ease of understanding, such communication means are not depicted, and a person having ordinary skill in the art will appreciate that such communication means are within the scope of the present disclosure. Although the local controllers 221-228, the sensors 231-238, the actuators 241-248, and the local HMIs 251-258 are each shown as a single block, it is to be understood that each local controller 221-228, sensor 231-238, actuator 241-248, and local HMI 251-258 may be or comprise a plurality of local controllers, sensors, actuators, and HMIs.

The sensors 231-238 may include sensors utilized for operation of the various subsystems 211-218 of the well construction system 100. For example, the sensors 231-238 may include cameras, position sensors, speed sensors, acceleration sensors, pressure sensors, force sensors, temperature sensors, flow rate sensors, vibration sensors, electrical current sensors, electrical voltage sensors, resistance sensors, gesture detection sensors or devices, voice actuated or recognition devices or sensors, chemical sensors, exhaust sensors, and/or other examples. The sensor data may include signals, information, and/or measurements indicative of equipment operational status (e.g., on or off, percent load, up or down, set or released, etc.), drilling parameters (e.g., depth, hook load, torque, etc.), auxiliary parameters (e.g., vibration data of a pump), flow rate, temperature, operational speed, position, and pressure, among other examples. The acquired sensor data may include or be associated with a timestamp (e.g., date and/or time) indicative of when the sensor data was acquired. The sensor data may also or instead be aligned with a depth or other drilling parameter.

The local controllers 221-228, the sensors 231-238, the actuators 241-248, and the local HMIs 251-258 may be communicatively connected with the central controller 192. For example, the sensors 231-238, the actuators 241-248, and the local HMIs 251-258 of the corresponding subsystems 211-218 may be communicatively connected with the local controllers 221-228 via local communication networks (e.g., field buses) (not shown) and the central controller 192 may be communicatively connected with the local controllers 221-228 via a central communication network 209 (e.g., a data bus, a field bus, a wide-area-network (WAN), a local-area-network (LAN), etc.). The sensor data output by the sensors 231-238 of the subsystems 211-218 may be received and processed by the local controllers 221-228 and/or the central controller 192. Similarly, control data output by the central controller 192 and/or the local controllers 221-228 may be communicated to the various actuators 241-248 of the subsystems 211-218, perhaps pursuant to predetermined programming, such as to facilitate well construction operations and/or other operations described herein. Although the central controller 192 is shown as a single device (i.e., a discrete hardware component), it is to be understood that the central controller 192 may be or comprise a plurality of equipment controllers and/or other electronic devices collectively operable to monitor and control operations (i.e., computational processes or methods) of the well construction system 100. The central controller 192 may be located within or form a portion of a control center 190, however a portion of the central controller 192 may instead be external to the control center 190.

The sensors 231-238 and actuators 241-248 may be monitored and/or controlled by corresponding local controllers 221-228 and/or the central controller 192. For example, the central controller 192 may be operable to receive sensor data from the sensors 231-238 of the subsystems 211-218 in real-time, and to output real-time control data directly to the actuators 241-248 of the subsystems 211-218 based on the received sensor data. However, certain operations of the actuators 241-248 of each subsystem 211-218 may be controlled by a corresponding local controller 221-228, which may control the actuators 241-248 based on sensor data received from the sensors 231-238 of the corresponding subsystem 211-218 and/or based on control data received from the central controller 192.

The rig control system 200 may be a tiered control system, wherein control of the subsystems 211-218 of the well construction system 100 may be provided via a first tier of the local controllers 221-228 and a second tier of the central controller 192. The central controller 192 may facilitate control of one or more of the subsystems 211-218 at the level of each individual subsystem 211-218. For example, in the FP system 212, sensor data may be fed into the local controller 242, which may respond to control the actuators 232. However, for control operations that involve multiple subsystems 211-218, the control may be coordinated through the central controller 192 operable to coordinate control of well construction equipment of two, three, four, or more (each) of the subsystems 211-218. For example, coordinated control operations may include the control of downhole pressure during tripping. The downhole pressure may be affected by the DFC system 214 (e.g., pump rate), the MPD system 213 (e.g., position of the choke 152), and the TH system 211 (e.g., tripping speed). Thus, when it is intended to maintain certain downhole pressure during tripping, the central controller 192 may output control data to two or more of the participating subsystems 211-218.

As described above, the central controller 192 may control various operations of the subsystems 211-218 via analysis of sensor data from one or more of the wellsite subsystems 211-218 to facilitate coordinated control between the subsystems 211-218. The central controller 192 may generate control data to coordinate operations of various well construction equipment of the subsystems 211-218. The control data may include, for example, commands from the rig personnel, such as turn on or turn off a pump, switch on or off a fluid valve, and update a physical property set-point, among other examples. The local controllers 221-228 may each include a fast control loop that directly obtains sensor data and executes, for example, a control algorithm to generate the control data. The central controller 192 may include a slow control loop to periodically obtain sensor data and generate the control data.

The rig control system 200, including the central controller 192 and the local controllers 221-228, facilitates operation of the well construction equipment in an equipment focused manner, such as to maintain the choke pressure to a certain value or to rotate the drill string at a certain rotational speed. The rig control system 200 may also coordinate operations of certain pieces of equipment to achieve intended operations, such as to move a tubular from the fingerboard to the well center, break up a tubular stand from the well center, or rack an individual tubular back to the fingerboard. Each such operation utilizes coordinated control of multiple pieces of pipe handling equipment by the central controller 192.

The central controller 192, the local controllers 221-228, and/or other controllers or processing devices (referred to hereinafter as "equipment controllers") of the rig control system 200 may each or collectively be operable to receive and store machine-readable and executable program code instructions (e.g., computer program code, algorithms, programmed processes or operations) on a memory device (e.g., a memory chip) and then execute the program code instructions to run, operate, or perform a control process for monitoring and/or controlling the well construction equipment of the well construction system 100.

A control workstation 197 may be utilized to monitor, configure, control, and/or otherwise operate one or more of the subsystems 211-218 by the rig personnel. The well construction system 100 may be monitored and/or controlled or operated at least partially manually by the rig personnel (e.g., a driller) via the control workstation 197. The control workstation 197 may be communicatively connected with the central controller 192 and/or the local controllers 221-228 via the communication network 209 and operable to receive sensor data from the sensors 231-238 and transmit control data to the central controller 192 and/or the local controllers 221-228 to control the actuators 241-248. Accordingly, the control workstation 197 may be utilized by the rig personnel to monitor, configure, and control the actuators 241-248 and other portions of the subsystems 211-218 via the central controller 192 and/or local controllers 221-228.

During manual or semi-automatic operation, the rig personnel may operate as the mechanization manager of the rig control system 200 by manually coordinating operations of various well construction equipment, such as to achieve an intended operational status (or drilling state) of the well construction operations, including tripping in or drilling at an intended rate of penetration (ROP). The control process of each local controller 221-228 may facilitate a lower (e.g., basic) level of control within the rig control system 200 to operate a corresponding piece of well construction equipment or a plurality of pieces of well construction equipment of a corresponding subsystem 211-218. Such control process may facilitate, for example, starting, stopping, and setting or maintaining an operating speed of a piece of well construction equipment. During manual operation of the well construction system 100, the rig personnel manually controls the individual pieces of well construction equipment to achieve the intended operational status of each piece of well construction equipment.

The central controller 192 may run (i.e., execute) a control process 260 (e.g., a coordinated control process or anther computer process) and each local controller 221-228 may run a corresponding control process (e.g., a local control process or another computer process, not shown). Two or more of the local controllers 221-228 may run their local control processes to collectively coordinate operations between well construction equipment of two or more of the subsystems 211-218. The control process 260 of the central controller 192 may operate as a mechanization manager of the rig control system 200, coordinating operational sequences of the well construction equipment of the well construction system 100.

The control process 260 of the central controller 192 may output control data directly to the actuators 241-248 to control the well construction operations. The control process 260 may also or instead output control data to the control process of one or more local controllers 221-228, wherein each control process of the local controllers 221-228 may then output control data to the actuators 241-248 of the corresponding subsystem 211-218 to control a portion of the well construction operations performed by that subsystem 211-218. Thus, the control processes of equipment controllers (e.g., central controller 192, local controllers 221-228) of the rig control system 200 individually and collectively perform monitoring and control operations described herein, including monitoring and controlling well construction operations. The program code instructions forming the basis for the control processes described herein may comprise rules (e.g., algorithms) based on the laws of physics for drilling and other well construction operations.

Each control process being run by an equipment controller of the rig control system 200 may receive and process (i.e., analyze) sensor data from the sensors 231-238 according to the program code instructions, and generate control data (i.e., control signals or information) to operate or otherwise control the actuators 241-248 of the well construction equipment. Equipment controllers within the scope of the present disclosure can include, for example, programmable logic controllers (PLCs), industrial computers (IPCs), personal computers (PCs), soft PLCs, variable frequency drives (VFDs) and/or other controllers or processing devices operable to store and execute program code instructions, receive sensor data, and output control data to cause operation of the well construction equipment based on the program code instructions, sensor data, and/or control data.

The central controller 192 may also or instead be operable to receive and store machine-readable and executable program code instructions on a memory device and then execute such program code instructions to run, operate, or perform a monitoring and notification process 262 operable to monitor operational parameters of the various well construction equipment to detect an abnormal condition (e.g., an abnormal operational status or event) associated with the well construction equipment of the well construction system 100 and to notify technical support personnel located off the wellsite of the abnormal condition. The monitoring and notification process 262 may be operable to analyze or otherwise process sensor data output by the sensors 231-238 and detect an abnormal condition experienced by or otherwise associated with one or more pieces of well construction equipment, and/or an abnormal condition experienced by or otherwise associated with a wellbore (e.g., the wellbore 102 shown in FIG. 1). The monitoring and notification process 262 may be operable to detect the abnormal condition based on the sensor data and output abnormal condition information (or data) indicative of the detected abnormal condition. One or more of the local controllers 221-228 may also execute program code instructions to execute a corresponding monitoring and notification process 262 to detect a local abnormal condition associated with that subsystem 211-218. The local controllers 221-228 may then transmit the abnormal condition information indicative of the local abnormal condition to the central controller 190 for analysis.

For example, an abnormal condition may be or comprise an abnormal operational surface condition experienced by surface equipment (e.g., the surface equipment 110 shown in FIG. 1) and/or an abnormal operational downhole condition experienced by a drill string (e.g., the drill string 120 shown in FIG. 1). An abnormal operational surface condition may include, for example, an abnormally high or low operating speed of a piece of well construction equipment, abnormally high vibrations associated with a piece of well construction equipment, an abnormally high or low operating temperature of a piece of well construction equipment, an abnormally high or low operating pressure of a piece of well construction equipment, an abnormally high or low fluid flow associated with a piece of well construction equipment, an abnormally high or low electrical voltage supplied to a piece of well construction equipment, and an abnormally high operating volume of a piece of well construction equipment. An example abnormal operational downhole condition may include stick slip, axial vibrations, lateral vibrations, rotational vibrations, and stuck drill pipe. The abnormal condition may instead be or comprise an abnormal downhole fluid condition experienced by a downhole fluid, such as wellbore fluid (e.g., drilling fluid, formation fluid) within the wellbore, and/or formation fluid within a rock formation (e.g., rock formation 106 shown in FIG. 1) through which the wellbore extends. An example abnormal downhole fluid condition may include underpressure of the formation fluid, overpressure of the formation fluid, gains of the wellbore fluid, and losses of the wellbore fluid. As described above, the monitoring and notification process 262 (executed by the central controller 192 and/or the local controllers 221-228) may be operable to analyze the sensor data generated by or otherwise facilitated by the various sensors 221-228 of the well construction system 100 to detect or otherwise determine if a piece of well construction equipment is experiencing an abnormal condition.

The abnormal condition information may be or comprise real-time and/or recorded sensor data associated with the abnormal condition or associated with a piece of equipment experiencing or otherwise associated with an abnormal condition. The abnormal condition information may be or comprise other data (e.g., operational set-points, operational configuration, control data) associated with the abnormal condition or associated with a piece of equipment experiencing or otherwise associated with an abnormal condition. The abnormal condition information may be or comprise an alert indicative of (e.g., describing) the abnormal condition and/or which piece of equipment is experiencing or otherwise associated with the abnormal condition.

Figure 3:
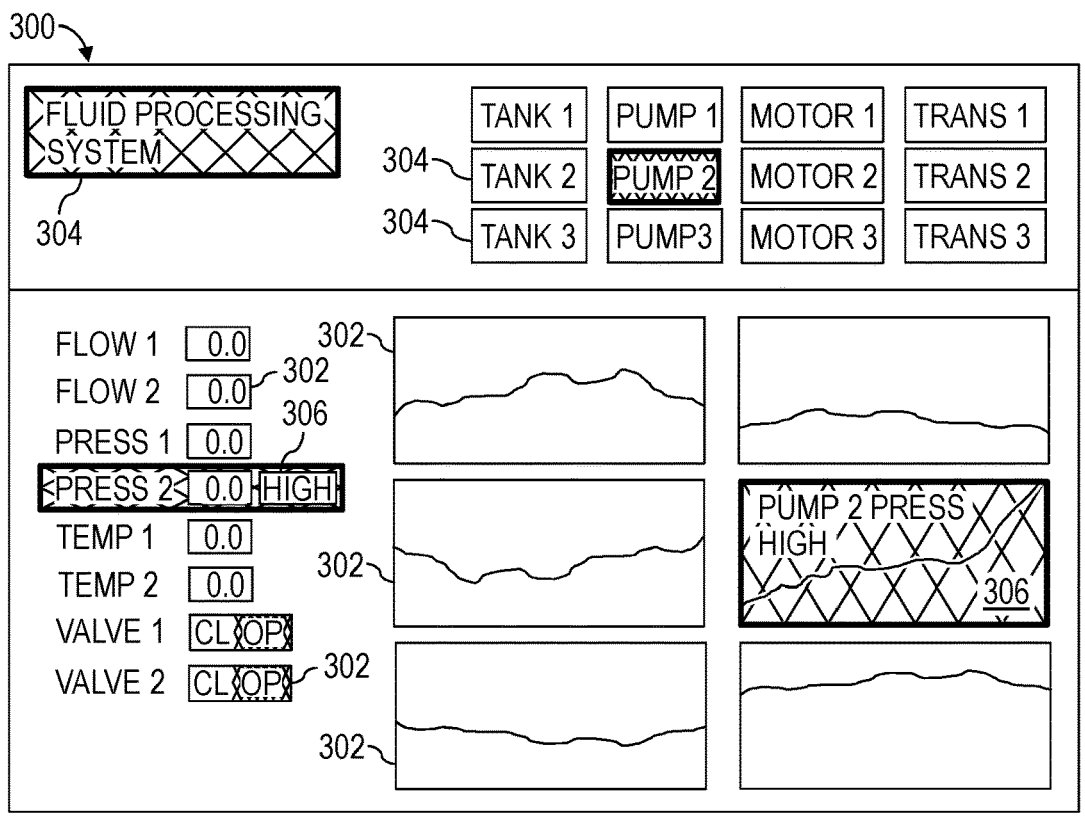
FIGS. 3-5 are example implementations of screens displayed by the apparatus shown in FIGS. 1 and 2 according to one or more aspects of the present disclosure.

The abnormal condition information may be displayed to technical support personnel via a communication device in a form of one or more diagnostic display screens (or dashboard) comprising a plurality of charts displaying an aggregation of alerts, cross-plots that highlight the abnormal condition, and/or other graphical tools that indicate trends and correlation with other well construction equipment or a link to the well construction operations. FIG. 3 is an example diagnostic display screen 300 displaying example abnormal condition information to technical support personnel that can be displayed on a communication device 266, 268 shown in FIG. 2. The abnormal condition information may comprise one or more streams of sensor data 302 indicative of the abnormal condition. The abnormal condition information may comprise one or more streams of sensor data 302 associated with a piece of well construction equipment and/or components of a piece of a well construction equipment experiencing or otherwise associated with the abnormal condition. The sensor data 302 may be displayed in numerical and/or graph form. The technical support personnel may select which abnormal condition information is displayed. For example, the technical support personnel may select the subsystem and/or the piece of well construction equipment for which the abnormal condition information is displayed, for example, via finger contact with the screen 300 and/or via an input device. Thus, the abnormal condition information may comprise one or more streams of sensor data 302 associated with a piece of well construction equipment and/or components of a piece of a well construction equipment that is selected by the technical support personnel. The abnormal condition information displayed on the screen 300 may comprise information 304 indicating which subsystem and/or which piece of well construction equipment is the displayed abnormal condition information associated with.

The abnormal condition information displayed on the screen 300 may comprise an alert 306 indicative of the abnormal condition associated with a piece of well construction equipment and/or components of a piece of a well construction equipment. The alert 306 may comprise a description of the abnormal condition, such as textual or graphical (e.g., highlighting, change of color, flashing text, appearance of a predetermined icon, etc.) information indicative of which piece of well construction equipment is experiencing the abnormal condition (e.g., second pump, first motor, third tank, etc.) and what operational parameter is abnormal (e.g., flow is low, temperature is high, pressure is high, etc.).

The monitoring and notification process 262 (executed by the central controller 192 and/or the local controllers 221-228) may be operable to output (e.g., transmit, push) the abnormal condition information to one or more remote communication devices 266, 268 to be displayed to the technical support personnel (e.g., engineers) located off the wellsite, at a remote location from the wellsite. The communication devices 264, 266, 268 may be or comprise mobile or non-mobile communication devices, such as PCs (e.g., desktops, laptops, and/or tablet computers), personal digital assistants, smartphones, servers, internet appliances, and/or other types of computing devices. The communication devices 264, 266, 268 may be mobile communication devices carried by the rig personnel and the technical support personnel or stationary communication devices accessible by the rig personnel and the technical support personnel. The remote communication devices 266, 268 may be located off the wellsite, at a remote location from the wellsite. One or more of the remote communication devices 266, 268, such as the remote communication device 268, may be located at a remote center 270 (e.g., a monitoring and control center, a technical support center).

The communication devices 266, 268 may be operable to communicatively connect with the central controller 192 and/or the local controllers 221-228 at least partially via the central communication network 209. However, the communication devices 266, 268 may also or instead be communicatively connected directly with the central controller 192 and/or directly with the local controllers 221-228. Thus, one or more of the communication devices 266, 268 may receive the abnormal condition information from the central controller 192. One or more of the communication devices 266, 268 may also or instead receive at least a portion of the abnormal condition information from the piece of equipment experiencing or otherwise associated with the abnormal condition. Communication between the communication devices 264, 266, 268 and the central controller 192 and/or central communication network 209 may be via wired and/or wireless communication means. However, for clarity and ease of understanding, such communication means are not depicted, and a person having ordinary skill in the art will appreciate that such communication means are within the scope of the present disclosure.

After the remote communication devices 266, 268 receive and display the abnormal condition information, the technical support personnel may analyze the abnormal condition information to diagnose the abnormal condition, and then determine and propose mitigating steps or actions (e.g., maintenance work, replacement of parts, resetting operational parameters, reprogramming) to be performed to mitigate the abnormal condition. The mitigating steps or actions may be performed on the piece of equipment experiencing the abnormal condition or another piece of equipment to mitigate the abnormal condition.

However, before the monitoring and notification process 262 outputs the abnormal condition information to the remote communication devices 266, 268, the monitoring and notification process 262 may determine a priority level associated with a detected abnormal condition. The priority level may control order in which the abnormal condition information is output to the remote communication devices 266, 268 to be displayed to the technical support personnel. The monitoring and notification process 262 may then output (e.g., transmit, push) the abnormal condition information to one or more of the communication devices 266, 268 to be displayed to the technical support personnel. If multiple abnormal conditions are detected, a relative priority level may be assigned to each detected abnormal condition. Thus, an abnormal condition information associated with a detected abnormal condition having a higher priority level may be output to a communication device 266, 268 before another abnormal condition information associated with another detected abnormal condition having a lower priority level is output to the communication device 266, 268. The priority level associated with an abnormal condition may be determined based on a database of abnormal conditions and priority levels assigned to the abnormal conditions. The priority level may also or instead indicate relative order in which the rig personnel (e.g., rig maintenance personnel) should perform or otherwise implement the determined mitigating steps or actions. The priority level may also or instead indicate the date and/or time by which the rig personnel should perform or otherwise implement the determined mitigating steps or actions. The priority level indicating order in which the rig personnel should perform the determined mitigating steps or actions may instead be determined by the technical support personnel.

If additional and/or more detailed information is needed or would help to diagnose the abnormal condition, the technical support personnel may remotely access control systems of the subsystems 211-218 and/or control systems of the individual pieces of equipment. Namely, one or more of the communication devices 266, 268 may be used by the technical support personnel to access a local controller 221-228 of a subsystem 211-218 or a piece of well construction equipment to access additional and/or more detailed information, such as sensor data, control data, and operational set-points. For example, the one or more of the remote communication devices 266, 268 may be operated to display one or more native operational status and configuration HMI screens of a subsystem 211-218 or a piece of well construction equipment experiencing or associated with the abnormal condition. The HMI screens may display operational status and operational configuration of a subsystem 211-218 or a piece of well construction equipment.

Figure 4:
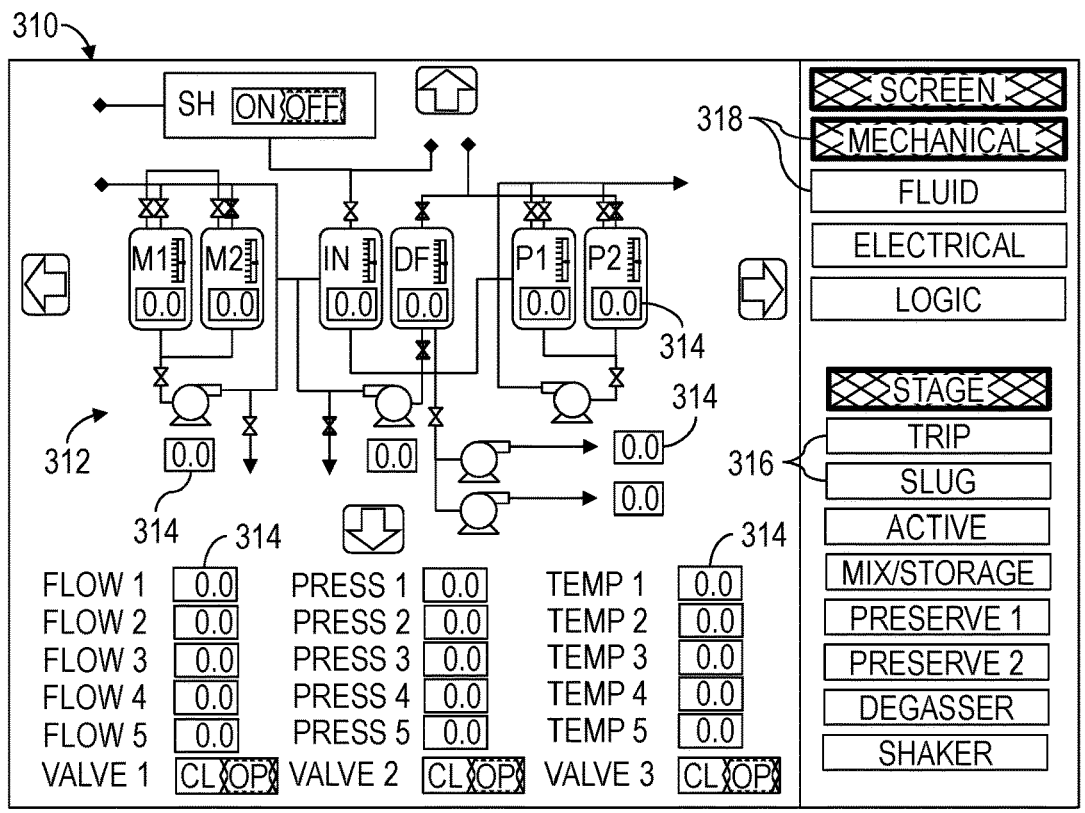

FIG. 4 is an example native operational status and configuration HMI screen 310 of a subsystem or a piece of equipment that may be displayed on a remote communication device 266, 268 to be viewed by technical support personnel. The HMI screen 310 displays information indicative of operational status and configuration of an FP system of the well construction system, such as the FP system 212 shown in FIG. 2. The HMI screen 310 may display current operational status (e.g., sensor data) of each of the various pieces of equipment of the FP system and current operational configuration (e.g., current set-points) of the various pieces of equipment of the FP system.

The HMI screen 310 may display a schematic representation 312 of the equipment of the FP system, and operational status and set-points of the equipment of the FP system, such as pressure, temperature, fluid level, flow rate, flow direction, valve position, and operational stage. Portions (e.g., fluid valves, tanks) of the schematic representation 312 may change position and/or color to visually indicate operational status (e.g., positions, levels) and set-points of the equipment. The operational status and set-points may be displayed within text boxes 314, some of which may be located in association with the schematic representation 312 of the wellsite equipment. The HMI screen 310 may display operational stages 316 of the equipment. The technical support personnel may scroll through different HMI screens, each showing different operational status and set-points of the equipment, such as by operating (e.g., touching, selecting) a corresponding selection buttons 318. Other HMI screens may show, for example, control logic diagrams and associated status and set-points, electrical diagrams and associated status and set-points, and fluid flow diagrams and associated status and set-points. Native operational status and configuration HMI screens, such as the HMI screen 310, may provide to the technical support personnel additional and/or more detailed information about the equipment that may help to diagnose the abnormal condition.

After an abnormal condition is detected and the abnormal condition information is transmitted to one or more of the communication devices 266, 268, the technical support personnel may perform diagnosis operations, by analyzing the abnormal condition information and determining mitigating tasks or actions to be performed on the piece of well construction equipment experiencing the abnormal condition to mitigate the abnormal condition before rig personnel attempts to mitigate the abnormal condition (i.e., before field escalation). The technical support personnel may analyze the abnormal condition information and determine if the alert generated by the monitoring and notification process 262 is valid or false. If the alert is a false alert, the technical support personnel may determine what caused such false alert. Thus, the technical support personnel may validate the abnormal condition alert before field escalation. The technical support personnel may assign a priority level to the work ticket 320 to indicate relative order in which the rig personnel should perform or otherwise implement the determined mitigating steps or actions and/or to indicate the date and time by which the rig personnel should perform or otherwise implement the determined mitigating steps or actions. The technical support personnel may then input into a corresponding communication device 266, 268 and such communication device 266, 268 may receive the alert validation information, the priority level information, and/or the mitigation information indicative of recommended mitigating tasks or actions to be performed by the rig personnel at the wellsite on the piece of equipment experiencing the abnormal condition to mitigate the abnormal condition. The mitigation information may then be output (e.g., transmitted) to a local communication device 264 to be viewed by the rig personnel, who will then perform the recommended mitigating tasks or actions to mitigate the abnormal condition.

Figure 5:
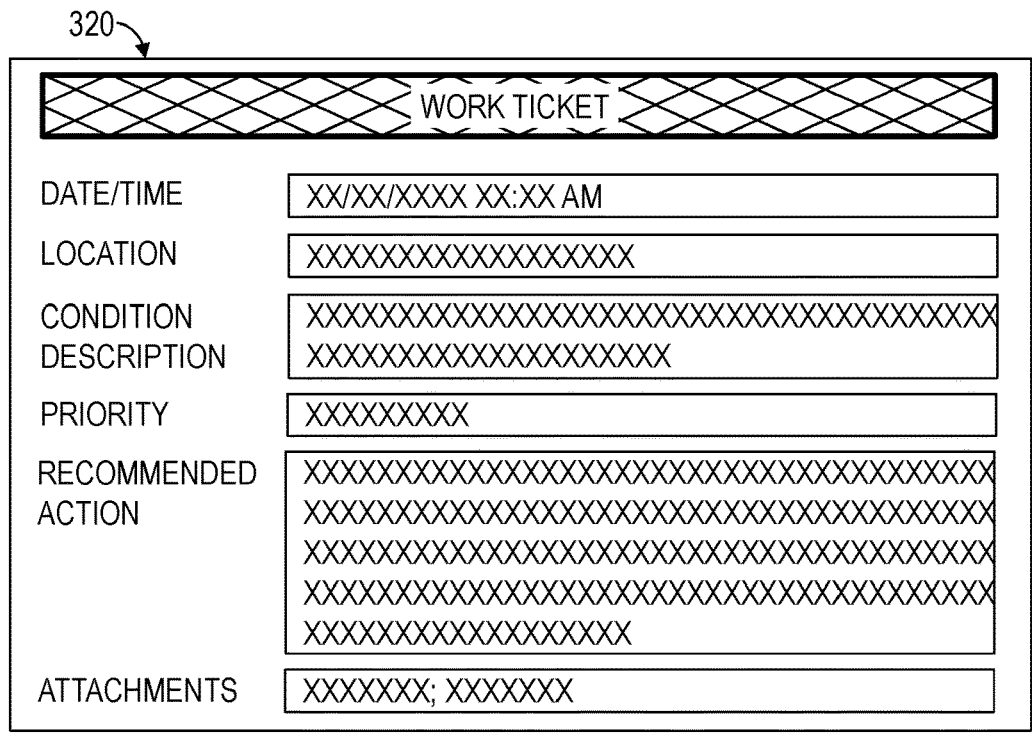

The mitigation information indicative of the recommended mitigating tasks or actions to be performed by the rig personnel may be transmitted to the local communication device 264 to be viewed by the rig personnel as part of a work order or ticket containing such mitigation information. FIG. 5 is an example work ticket 330 that may be transmitted to the rig personnel from the technical support personnel. The work ticket 330 may comprise information indicative of the location and time that the abnormal condition was detected, a description or other information indicative of the abnormal condition, a priority (or urgency) level assigned to the work ticket, and mitigation information comprising a description of recommended tasks or actions to be performed by the rig personnel to mitigate the abnormal condition. The work ticket may also include a list of attachments that are transmitted along with the work ticket 330 that may help the rig personnel to perform the recommended mitigating tasks or actions.

The information indicative of the abnormal condition may comprise a description of the abnormal condition, such as which operational parameters were determined to be abnormal. The priority level may indicate to the rig personnel by when or in what order with respect to other work tickets should the rig personnel perform or otherwise implement the recommended mitigating tasks or actions. The recommended tasks or actions may comprise a description of one or more tasks or actions (either from maintenance or operational parameters) that the rig personnel are to perform in a described order to attempt to mitigate the abnormal condition. If the abnormal condition alert was determined to be a false alert, the recommended tasks or actions may direct the rig personnel to ignore the alert. The attachments that may be transmitted along with the work ticket 330 may include, for example, maintenance manuals, parts lists, and electrical schematics.

After the rig personnel performs or at least attempts to perform the recommended mitigating tasks or actions received from the technical support personnel, the rig personnel may validate the detected abnormal condition, such as by checking and recording whether the abnormal condition detected by the monitoring and notification process 262 was a false alarm or an actual operational (e.g., mechanical, electrical, control, sensory, etc.) problem associated with a piece of well construction equipment. If the detected abnormal condition was a false alarm, the rig personnel may record that the detected abnormal condition was a false alarm. If the detected abnormal condition was an actual operational problem, the rig personnel may performs the recommended mitigating tasks or actions.

After the rig personnel performs the recommended mitigating tasks or actions to mitigate the abnormal condition, a post mitigation protocol may be performed. The post mitigation protocol may comprise recording whether one of the recommended tasks or actions suggested by the technical support personnel mitigated the abnormal condition. If one of the recommended tasks or actions suggested by the technical support personnel mitigated the abnormal condition, the rig personnel may record which of the recommended tasks or actions mitigated the abnormal condition. If one or more of the recommended tasks or actions did not mitigate the abnormal condition, the rig personnel may record that such recommended tasks or actions did not mitigate the abnormal condition. The post mitigation protocol may also include a maintenance follow-up at one or more time intervals following the performance of the mitigating tasks or actions performed by the rig personnel to check if the abnormal condition has returned or is starting to return and recording such findings. The validation and post mitigation protocol findings may be recorded to a database in association with the work order 320 and/or in association with a description of the associated abnormal condition, such that proper mitigating tasks or actions that actually mitigate the abnormal condition may be implemented and the mitigating tasks or actions that do not mitigate the abnormal condition may be avoided when the same or similar abnormal condition is detected in the future at the same or another wellsite.

Figure 6:
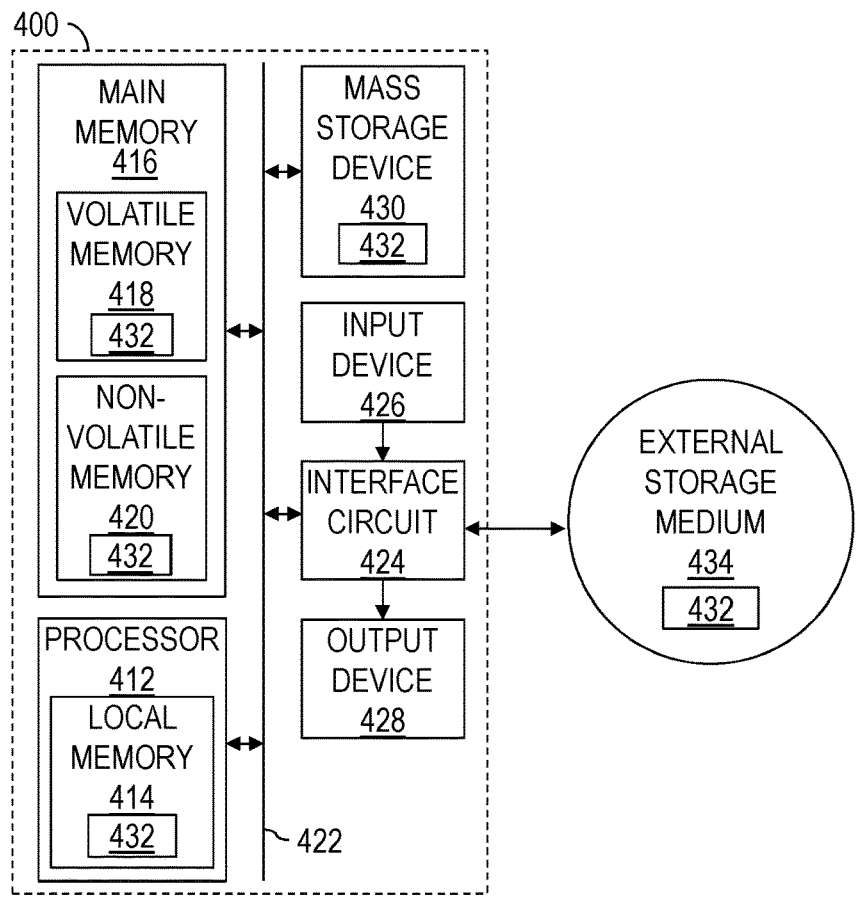
FIG. 6 is a schematic view of at least a portion of an example implementation of apparatus according to one or more aspects of the present disclosure.

FIG. 6 is a schematic view of at least a portion of an example implementation of a processing device 400 (or system) according to one or more aspects of the present disclosure. The processing device 400 may be or form at least a portion of one or more equipment controllers and/or other electronic devices shown in one or more of the FIGS. 1-5. Accordingly, the following description refers to FIGS. 1-6, collectively.

The processing device 400 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 400 may be or form at least a portion of the rig control system 200, including the central controller 192, the local controllers 221-228, the communication devices 264, 266, 268, and the control workstation 197. Although it is possible that the entirety of the processing device 400 is implemented within one device, it is also contemplated that one or more components or functions of the processing device 400 may be implemented across multiple devices, some or an entirety of which may be at the wellsite and/or remote from the wellsite.

The processing device 400 may comprise a processor 412, such as a general-purpose programmable processor. The processor 412 may comprise a local memory 414, and may execute machine-readable and executable program code instructions 432 (i.e., computer program code) present in the local memory 414 and/or another memory device. The processor 412 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 412 include one or more INTEL microprocessors, microcontrollers from the ARM and/or PICO families of microcontrollers, embedded soft/hard processors in one or more FPGAs.

The processor 412 may execute, among other things, the program code instructions 432 and/or other instructions and/or programs to implement the example methods and/or operations described herein. For example, the program code instructions 432, when executed by the processor 412 of the processing device 400, may cause the processor 412 to receive and process (e.g., compare) sensor data (e.g., sensor measurements). The program code instructions 432, when executed by the processor 412 of the processing device 400, may also or instead cause the processor 412 to output control data (i.e., control commands) to cause one or more portions or pieces of well construction equipment of a well construction system to perform the example methods and/or operations described herein.

The processor 412 may be in communication with a main memory 416, such as may include a volatile memory 418 and a non-volatile memory 420, perhaps via a bus 422 and/or other communication means. The volatile memory 418 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by read-only memory, flash memory, and/or other types of memory devices. One or more memory controllers (not shown) may control access to the volatile memory 418 and/or non-volatile memory 420.

The processing device 400 may also comprise an interface circuit 424, which is in communication with the processor 412, such as via the bus 422. The interface circuit 424 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 424 may comprise a graphics driver card. The interface circuit 424 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 400 may be in communication with various sensors, video cameras, actuators, processing devices, equipment controllers, and other devices of the well construction system via the interface circuit 424. The interface circuit 424 can facilitate communications between the processing device 400 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 426 may also be connected to the interface circuit 424. The input devices 426 may permit a human user to enter the program code instructions 432, which may be or comprise control data, operational parameters, operational set-points, a well construction plan, and/or a database of operational sequences. The program code instructions 432 may further comprise modeling or predictive routines, equations, algorithms, processes, applications, and/or other programs operable to perform example methods and/or operations described herein. The input devices 426 may be, comprise, or be implemented by a keyboard, a mouse, a joystick, a touchscreen, a track-pad, a trackball, an isopoint, and/or a voice recognition system, among other examples. One or more output devices 428 may also be connected to the interface circuit 424. The output devices 428 may permit for visualization or other sensory perception of various data, such as sensor data, status data, and/or other example data. The output devices 428 may be, comprise, or be implemented by video output devices (e.g., an LCD, an LED display, a CRT display, a touchscreen, etc.), printers, and/or speakers, among other examples. The one or more input devices 426 and the one or more output devices 428 connected to the interface circuit 424 may, at least in part, facilitate the communication devices described herein.

The processing device 400 may comprise a mass storage device 430 for storing data and program code instructions 432. The mass storage device 430 may be connected to the processor 412, such as via the bus 422. The mass storage device 430 may be or comprise a tangible, non-transitory storage medium, such as a floppy disk drive, a hard disk drive, a compact disk (CD) drive, and/or digital versatile disk (DVD) drive, among other examples. The processing device 400 may be communicatively connected with an external storage medium 434 via the interface circuit 424. The external storage medium 434 may be or comprise a removable storage medium (e.g., a CD or DVD), such as may be operable to store data and program code instructions 432.

As described above, the program code instructions 432 may be stored in the mass storage device 430, the main memory 416, the local memory 414, and/or the removable storage medium 434. Thus, the processing device 400 may be implemented in accordance with hardware (perhaps implemented in one or more chips including an integrated circuit, such as an ASIC), or may be implemented as software or firmware for execution by the processor 412. In the case of firmware or software, the implementation may be provided as a computer program product including a non-transitory, computer-readable medium or storage structure embodying computer program code instructions 432 (i.e., software or firmware) thereon for execution by the processor 412. The program code instructions 432 may include program instructions or computer program code that, when executed by the processor 412, may perform and/or cause performance of example methods, processes, and/or operations described herein.

The present disclosure is further directed to example methods (e.g., operations and/or processes) of performing wellsite operations described herein. The methods may be performed by utilizing or otherwise in conjunction with at least a portion of one or more implementations of one or more instances of the apparatus shown in one or more of FIGS. 1-6, and/or otherwise within the scope of the present disclosure. The methods may be caused to be performed, at least partially, by a processing device, such as the processing device 400 executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be caused to be performed, at least partially, by a human wellsite operator utilizing one or more instances of the apparatus shown in one or more of FIGS. 1-6, and/or otherwise within the scope of the present disclosure. Thus, the following description of example methods refer to apparatus shown in one or more of FIGS. 1-6. However, the methods may also be performed in conjunction with implementations of apparatus other than those depicted in FIGS. 1-6 that are also within the scope of the present disclosure.

An example method according to one or more aspects of the present disclosure may comprise commencing operation of a monitoring system 192 of a well construction system 100. The well construction system 100 may be is located at a wellsite 104 and may comprise a plurality of pieces of equipment operable to perform well construction operations. Commencing operation of the monitoring system 192 may cause the monitoring system 192 to: receive sensor data facilitated by a plurality of sensors 231-238 each disposed in association with a corresponding piece of equipment; detect an abnormal condition associated with a piece of equipment based on the sensor data; and output abnormal condition information indicative of the abnormal condition to a first communication device 266, 268.

The method may further comprise displaying on the first communication device 266, 268 to technical support personnel the abnormal condition information; receiving by the first communication device 266, 268 from the technical support personnel mitigation information indicative of mitigating action to be performed to mitigate the abnormal condition; and transmitting the mitigation information from the first communication device 266, 268 to a second communication device 264 to be viewed by maintenance personnel who are to perform the mitigating action. The method may also comprise, before receiving the mitigation information and transmitting the mitigation information: communicatively connecting the first communication device 266, 268 with the piece of equipment associated with the abnormal condition; and displaying a native HMI screen 310 of the piece of equipment associated with the abnormal condition, wherein the native HMI screen 310 contains at least a portion of the abnormal condition information.

The abnormal condition information may comprise the sensor data associated with the piece of equipment associated with the abnormal condition, and an alert describing the abnormal condition and indicating which piece of equipment is associated with the abnormal condition. The mitigation information may be further indicative of whether the alert is valid or false.

Another example method according to one or more aspects of the present disclosure may comprise commencing operation of a monitoring system 192 of a well construction system 100. The well construction system 100 may be located at a wellsite 104 and may comprise a plurality of pieces of equipment operable to perform well construction operations. Commencing operation of the monitoring system 192 may cause the monitoring system 192 to: receive sensor data facilitated by a plurality of sensors 231-238 each disposed in association with a corresponding piece of equipment; output an alert indicative of an abnormal condition associated with a piece of equipment based on the sensor data; and transmit the alert and abnormal condition sensor data associated with the piece of equipment associated with the abnormal condition to a first communication device 266, 268 located at a remote location from the wellsite. Commencing operation of the monitoring system may further cause the monitoring system to determine a priority level associated with the abnormal condition. The priority level may be indicative of when the monitoring system will output the abnormal condition information to the first communication device.

The method may further comprise displaying on the first communication device 266, 268 to technical support personnel the alert and abnormal condition sensor data; receiving by the first communication device 266, 268 from the technical support personnel mitigation information indicative of mitigating action to be performed to mitigate the abnormal condition; and transmitting the mitigation information from the first communication device 266, 268 to a second communication device 264 located at the wellsite 104 to be viewed by maintenance personnel who are to perform the mitigating action. The method may also comprise, before receiving the mitigation information and transmitting the mitigation information: communicatively connecting the first communication device 266, 268 with the piece of equipment associated with the abnormal condition; and displaying a native HMI screen 310 of the piece of equipment associated with the abnormal condition, wherein the native HMI screen 310 may contain at least a portion of the abnormal condition sensor data.

In view of the entirety of the present disclosure, including the figures and the claims, a person having ordinary skill in the art will readily recognize that the present disclosure introduces an apparatus comprising a monitoring system of a well construction system, wherein the well construction system is located at a wellsite and comprises a plurality of pieces of equipment operable to perform well construction operations, and wherein the monitoring system comprises: a plurality of sensors each disposed in association with a corresponding piece of equipment and operable to facilitate sensor data indicative of operational status of that piece of equipment; a first communication device; a second communication device; and a monitoring device comprising a processor and a memory storing an executable program code, wherein during the well construction operations the monitoring device is operable to receive the sensor data, detect an abnormal condition associated with a corresponding piece of equipment based on the sensor data, and output abnormal condition information indicative of the abnormal condition to the first communication device. The first communication device is operable to: display to technical support personnel the abnormal condition information; receive from the technical support personnel mitigation information indicative of action to be performed by maintenance personnel to mitigate the abnormal condition; and output the mitigation information to the second communication device for viewing by the maintenance personnel.

The first communication device may be or comprise a mobile communication device.

The first communication device may be located at a location remote from the wellsite.

The second communication device may be located at the wellsite.

The abnormal condition information may comprise sensor data associated with a piece of equipment associated with the abnormal condition.

The abnormal condition information may comprise an alert describing the abnormal condition and indicating which piece of equipment is associated with the abnormal condition.

The first communication device may be operable to: communicatively connect with the monitoring device; and receive the abnormal condition information from the monitoring device.

The first communication device may be operable to: communicatively connect with the piece of equipment associated with the abnormal condition; and receive at least a portion of the abnormal condition information from the piece of equipment associated with the abnormal condition.

The first communication device may be operable to: communicatively connect with the piece of equipment associated with the abnormal condition; and display a native HMI screen of the piece of equipment associated with the abnormal condition, wherein the native HMI screen may contain at least a portion of the abnormal condition information.

The monitoring device may be further operable to determine a priority level associated with the abnormal condition. The priority level may be indicative of when the monitoring device will output the abnormal condition information to the first communication device.

The present disclosure also introduces a method comprising commencing operation of a monitoring system of a well construction system, wherein the well construction system is located at a wellsite and comprises a plurality of pieces of equipment operable to perform well construction operations, and wherein commencing operation of the monitoring system causes the monitoring system to: receive sensor data facilitated by a plurality of sensors each disposed in association with a corresponding piece of equipment; detect an abnormal condition associated with a piece of equipment based on the sensor data; and output abnormal condition information indicative of the abnormal condition to a first communication device. The method also comprises: displaying the abnormal condition information to technical support personnel via the first communication device; receiving, by the first communication device and from the technical support personnel, mitigation information indicative of mitigating action to be performed to mitigate the abnormal condition; and transmitting the mitigation information from the first communication device to a second communication device to be viewed by maintenance personnel who are to perform the mitigating action.

The first communication device may be or comprise a mobile communication device.

The first communication device may be located at a location remote from the wellsite, and the second communication device may be located at the wellsite.

The abnormal condition information may comprise: the sensor data associated with the piece of equipment associated with the abnormal condition; and an alert describing the abnormal condition and indicating which piece of equipment is associated with the abnormal condition. The mitigation information may be further indicative of whether the alert is valid or false.

The method may further comprise, before receiving the mitigation information and transmitting the mitigation information: communicatively connecting the first communication device with the piece of equipment associated with the abnormal condition; and displaying a native HMI screen of the piece of equipment associated with the abnormal condition, wherein the native HMI screen may contain at least a portion of the abnormal condition information.

The present disclosure also introduces a method comprising commencing operation of a monitoring system of a well construction system, wherein the well construction system is located at a wellsite and comprises a plurality of pieces of equipment operable to perform well construction operations, and wherein commencing operation of the monitoring system causes the monitoring system to: receive sensor data facilitated by a plurality of sensors each disposed in association with a corresponding piece of equipment; output an alert indicative of an abnormal condition associated with a piece of equipment based on the sensor data; and transmit the alert and abnormal condition sensor data associated with the piece of equipment associated with the abnormal condition to a first communication device located at a location remote from the wellsite. The method also comprises: displaying the alert and abnormal condition sensor data to technical support personnel on the first communication device; receiving, by the first communication device and from the technical support personnel, mitigation information indicative of mitigating action to be performed to mitigate the abnormal condition; and transmitting the mitigation information from the first communication device to a second communication device located at the wellsite to be viewed by maintenance personnel who are to perform the mitigating action.

The mitigation information may be further indicative of whether the alert is valid or false.

The method may further comprise, before receiving the mitigation information and transmitting the mitigation information: communicatively connecting the first communication device with the piece of equipment associated with the abnormal condition; and displaying a native HMI screen of the piece of equipment associated with the abnormal condition, wherein the native HMI screen may contain at least a portion of the abnormal condition sensor data.

Commencing operation of the monitoring system may further cause the monitoring system to determine a priority level associated with the abnormal condition. The priority level may be indicative of when the monitoring system will output the abnormal condition information to the first communication device.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

What is claimed is:

1. An apparatus comprising:
   a monitoring system of a well construction system, wherein the well construction system is located at a wellsite and comprises a plurality of pieces of equipment operable to perform well construction operations, and wherein the monitoring system comprises:
- a plurality of sensors each disposed in association with a corresponding piece of equipment and operable to facilitate sensor data indicative of operational status of that piece of equipment;
- a first communication device at a location remote from the wellsite;
- a second communication device; and
- a monitoring device comprising a processor and a memory storing an executable program code, wherein during the well construction operations the monitoring device is operable to:
  - receive the sensor data;
  - automatically detect an abnormal condition associated with a corresponding piece of equipment based on the sensor data; and
  - output abnormal condition information indicative of the abnormal condition to the first communication device;
- wherein the first communication device is operable to:
  - responsive to the output of the abnormal condition information associated with the piece of equipment, communicatively connect the first communication device, at the location remote from the wellsite, with the piece of equipment, at the wellsite, associated with the abnormal condition to receive operational information;
  - display the abnormal condition information and the operational information to technical support personnel;
  - responsive to the display, receive, from the technical support personnel, mitigation information indicative of action to be performed by maintenance personnel on one or more of the pieces of equipment to mitigate the abnormal condition prior to field escalation at the wellsite; and
  - output the mitigation information to the second communication device for viewing by the maintenance personnel.

2. The apparatus of claim 1 wherein the first communication device is or comprises a mobile communication device.

3. The apparatus of claim 1 wherein the second communication device is located at the wellsite.

4. The apparatus of claim 1 wherein the abnormal condition information comprises sensor data associated with a piece of equipment associated with the abnormal condition.

5. The apparatus of claim 1 wherein the abnormal condition information comprises an alert describing the abnormal condition and indicating which piece of equipment is associated with the abnormal condition.

6. The apparatus of claim 1 wherein the first communication device is operable to:
- communicatively connect with the monitoring device; and
- receive the abnormal condition information from the monitoring device.

7. The apparatus of claim 1 wherein the first communication device is operable to:
- receive at least a portion of the abnormal condition information from the piece of equipment associated with the abnormal condition.

8. The apparatus of claim 1 wherein the first communication device is operable to:
- display a native human machine interface (HMI) screen of the piece of equipment associated with the abnormal condition, wherein the native HMI screen contains at least a portion of the abnormal condition information and at least a portion of the operational information, wherein the native HMI screen is generated by a corresponding local controller running or otherwise executing a native computer program code to operate or control the corresponding piece of equipment.

9. The apparatus of claim 1 wherein the monitoring device is further operable to determine a priority level associated with the abnormal condition, and wherein the priority level is indicative of when the monitoring device will output the abnormal condition information to the first communication device to reduce risk of field escalation at the wellsite prior to receipt of the mitigation information by the second communication device.

10. A method comprising:
- commencing operation of a monitoring system of a well construction system, wherein the well construction system is located at a wellsite and comprises a plurality of pieces of equipment operable to perform well construction operations, and wherein commencing operation of the monitoring system causes the monitoring system to:
  - receive sensor data facilitated by a plurality of sensors each disposed in association with a corresponding piece of equipment;
  - automatically detect an abnormal condition associated with a piece of equipment based on the sensor data;
  - output abnormal condition information indicative of the abnormal condition to a first communication device at a location remote from the wellsite; and
  - responsive to the output of the abnormal condition associated with the piece of equipment, communicatively connect the first communication device, at the location remote from the wellsite, with the piece of equipment, at the wellsite, associated with the abnormal condition to receive operational information;
- displaying the abnormal condition information and the operational information to technical support personnel via the first communication device;
- responsive to the displaying, receiving, by the first communication device and from the technical support personnel, mitigation information indicative of mitigating action to be performed on one or more of the pieces of equipment to mitigate the abnormal condition prior to field escalation at the wellsite; and
- transmitting the mitigation information from the first communication device to a second communication device to be viewed by maintenance personnel who are to perform the mitigating action.

11. The method of claim 10 wherein the first communication device is or comprises a mobile communication device.

12. The method of claim 10 wherein the second communication device is located at the wellsite.

13. The method of claim 10 wherein the abnormal condition information comprises:
- the sensor data associated with the piece of equipment associated with the abnormal condition; and
- an alert describing the abnormal condition and indicating which piece of equipment is associated with the abnormal condition.

14. The method of claim 13 wherein the mitigation information is further indicative of whether the alert is valid or false.

15. The method of claim 10 further comprising, before receiving the mitigation information and transmitting the mitigation information:
- displaying a native human machine interface (HMI) screen of the piece of equipment associated with the abnormal condition, wherein the native HMI screen contains at least a portion of the abnormal condition information and at least a portion of the operational information, wherein the native HMI screen is generated by a corresponding local controller running or otherwise executing a native computer program code to operate or control the corresponding piece of equipment.

16. A method comprising:
- commencing operation of a monitoring system of a well construction system, wherein the well construction system is located at a wellsite and comprises a plurality of pieces of equipment operable to perform well construction operations, and wherein commencing operation of the monitoring system causes the monitoring system to:
  - receive sensor data facilitated by a plurality of sensors each disposed in association with a corresponding piece of equipment;
  - automatically output an alert indicative of an abnormal condition associated with a piece of equipment based on the sensor data;
  - transmit the alert and abnormal condition sensor data associated with the piece of equipment associated with the abnormal condition to a first communication device located at a location remote from the wellsite; and
  - responsive to the transmission of the alert and the abnormal condition associated with the piece of equipment, communicatively connect the first communication device, at the location remote from the wellsite, with the piece of equipment, at the wellsite, associated with the abnormal condition to receive operational information;
- displaying to technical support personnel, on the first communication device, the alert, the operational information and abnormal condition sensor data;
- responsive to the displaying, receiving, by the first communication device and from the technical support personnel, mitigation information indicative of mitigating action to be performed on one or more of the pieces of equipment to mitigate the abnormal condition prior to field escalation at the wellsite; and
- transmitting the mitigation information from the first communication device to a second communication device located at the wellsite to be viewed by maintenance personnel who are to perform the mitigating action.

17. The method of claim 16 wherein the mitigation information is further indicative of whether the alert is valid or false.

18. The method of claim 16 further comprising, before receiving the mitigation information and transmitting the mitigation information:
- displaying a native human machine interface (HMI) screen of the piece of equipment associated with the abnormal condition, wherein the native HMI screen contains at least a portion of the abnormal condition sensor data and at least a portion of the operational information, wherein the native HMI screen is generated by a corresponding local controller running or otherwise executing a native computer program code to operate or control the corresponding piece of equipment.

19. The method of claim 16 wherein commencing operation of the monitoring system further causes the monitoring system to determine a priority level associated with the abnormal condition, and wherein the priority level is indicative of when the monitoring system will output the abnormal condition information to the first communication device to reduce risk of field escalation at the wellsite prior to receipt of the mitigation information by the second communication device.

20. The apparatus of claim 1 wherein the first communication device is operable to receive information from one or more other monitoring devices at one or more other wellsites, communicatively connect with pieces of equipment at the one or more other wellsites, and output corresponding mitigation information to the second communication device and/or one or more other second communication devices for viewing by the maintenance personnel and/or other maintenance personnel.

* * * * *